(No Model.) 2 Sheets—Sheet 2.
G. C. ORMEROD.
CABLE SWITCH.
No. 529,530. Patented Nov. 20, 1894.
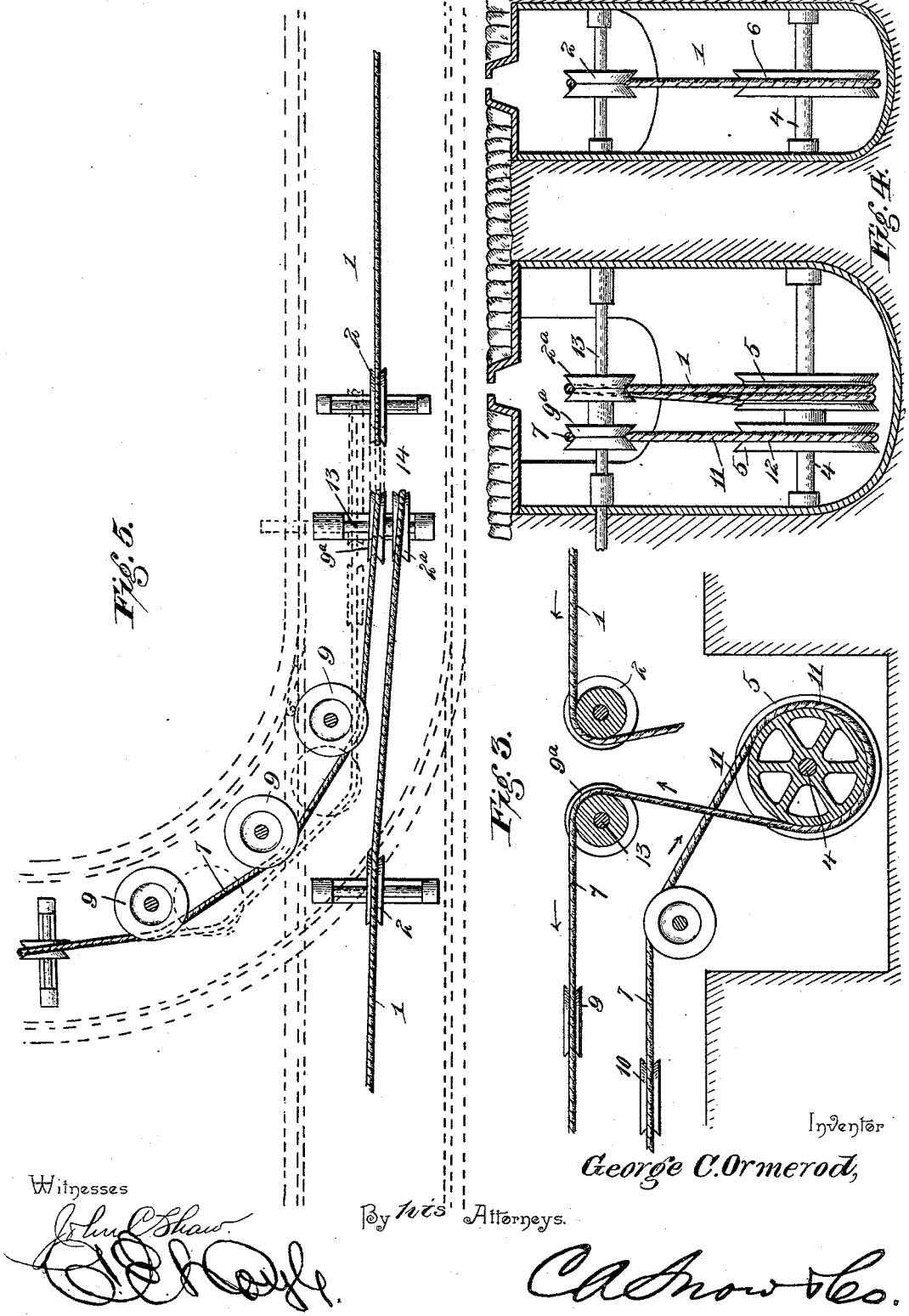
Witnesses
Inventor
George C. Ormerod,
By his Attorneys.

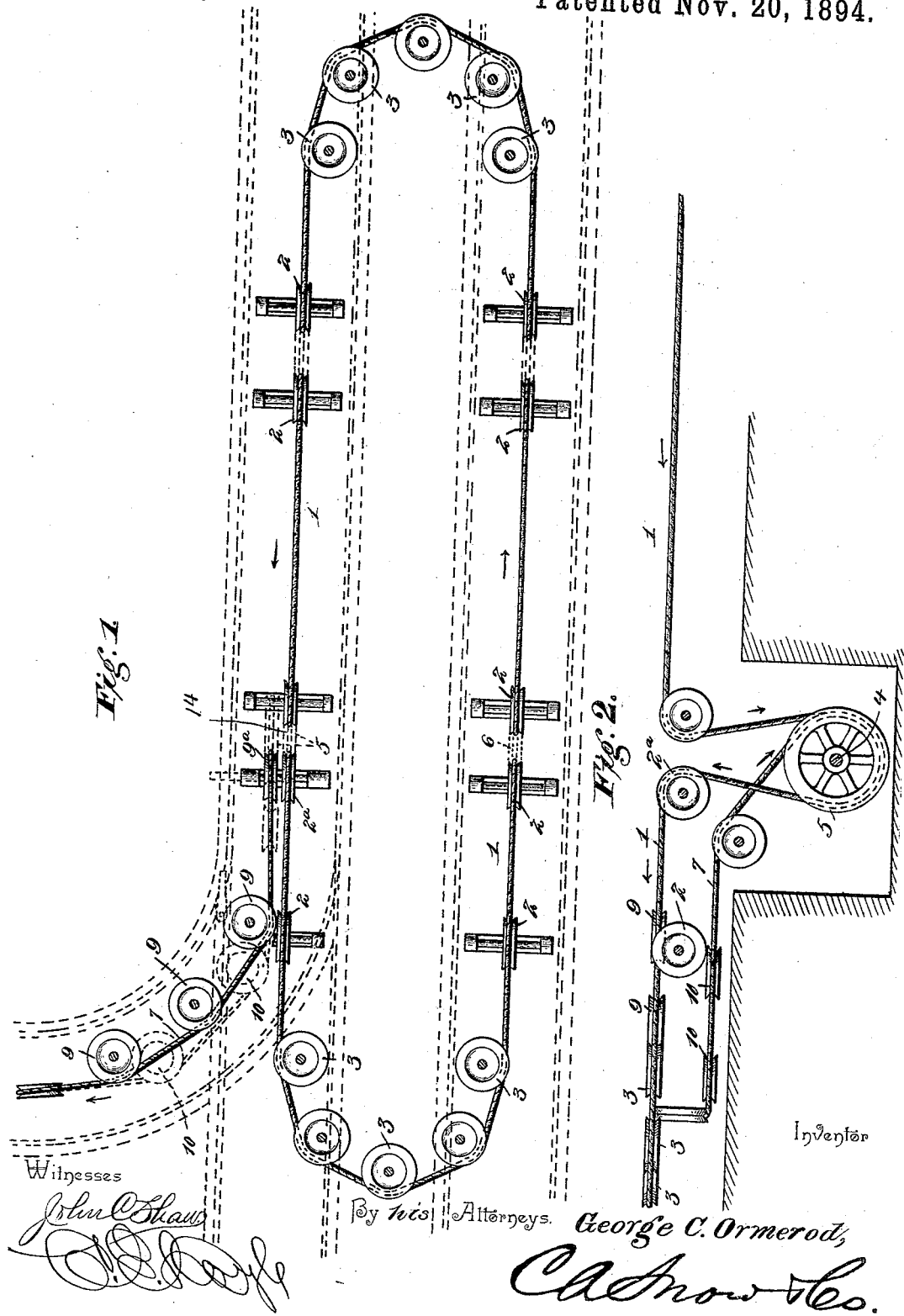

UNITED STATES PATENT OFFICE.

GEORGE C. ORMEROD, OF ASBURY PARK, NEW JERSEY.

CABLE-SWITCH.

SPECIFICATION forming part of Letters Patent No. 529,530, dated November 20, 1894.

Application filed February 9, 1894. Serial No. 499,662. (No model.)

*To all whom it may concern:*

Be it known that I, GEORGE C. ORMEROD, a citizen of the United States, residing at Asbury Park, in the county of Monmouth and State of New Jersey, have invented a new and useful Cable-Switch, of which the following is a specification.

The invention relates to cable-switches for traction roads, and has for its object to provide a simple, inexpensive and efficient means for transferring the grip from one main-line cable to another arranged at an angle thereto without loss of time or speed and without requiring that the car run for an interval upon its acquired speed or momentum before the grip can be brought into operative relation with the second cable.

With this object in view the invention consists in a certain novel construction, combination, and arrangement of parts which will be fully described hereinafter in connection with the drawings, and specifically pointed out in the appended claims.

In the drawings: Figure 1 is a plan view of a cable system embodying my invention, showing only the upper or operative side of the cable. Fig. 2 is a side view, showing the disposition of the driving-shaft and drum with relation to the other parts of the mechanism. Fig. 3 is a vertical section transverse to the driving-shaft, through the portion of the drum which carries the switch-cable. Fig. 4 is a vertical section taken parallel with and in the plane of the driving-shaft, and through the up and down tracks of the same line. Fig. 5 is a plan view of a portion of the system, showing the switch-pulleys set to connect the switch-cable with the main-line cable.

Similar numerals of reference indicate corresponding parts in all the figures of the drawings.

1 designates the main-line cable which, as in the ordinary practice, is continuous or endless, the two sides which move in opposite directions being arranged at the centers, respectively, of the "up" and "down" tracks, as indicated by the arrows in Fig. 1. The sides of this main-line cable are carried and held in the proper positions for the engagement of the car-grips by means of the surface-pulleys 2 and the loop-pulleys 3, the latter being arranged at the terminals of the line. The main-line cable is driven by means of a driving or power shaft 4 and a drum 5 fixed to said shaft, the cable being arranged in a plurality of coils around said drum in order to give the necessary friction for operating the cable. The main-line cable is driven, in the instance illustrated in the drawings, by its "up" side, and hence the "down" side, at the point of application of power, is carried around an idle pulley 6.

The switch-cable 7, the surface side of which is curved or bowed, connects the main-line cable, at the point of application of power, to the branch-line cable, 8 (not shown,) which is arranged at an angle to the main-line cable. This switch cable is carried by the surface pulleys 9, which may be arranged in any suitable relative positions to dispose the end portions of the switch-cable in proper relation with the main and branch line cables, and the return side of the switch-cable may be carried in any suitable manner, as by return or direction pulleys 10, as shown in dotted lines in Fig. 1 and in full lines in Figs. 2 and 3.

The switch-cable is driven by the same power as that which is employed for the operation of the main-line cable, and its inner portion or end, as shown at 11, is carried around the drum 5. In the drawings I have shown the switch-cable arranged in a separate compartment or groove 12 of the drum, for the reason that it prevents contact between the main-line and switch-cables.

The surface-pulleys 2ª and 9ª which carry adjacent portions of the main-line and switch cables, I have termed switch-pulleys. They may be rigidly connected to rotate in unison, as indicated in the drawings, for the reason that as both cables derive power from the same drum, independent rotation is impossible, but this construction is not essential to my invention and may be varied as desired to suit different conditions of location, application of power, &c. These switch-pulleys are preferably mounted upon an axially slidable spindle 13, or are slidable upon said spindle, whereby the portion of cable carried by either may be arranged in alignment with an opposite laterally-immovable portion of the main-line cable, as shown at 14, to enable a car-grip to pass without interruption from one portion to another of the main-line cable or from the main-line cable to the end of the switch-cable. Any suitable means may be provided for moving the switch-pulleys laterally to bring either opposite the said portion of the main-line cable, but as the devices for this purpose are numerous I have deemed it unnecessary to illustrate any form thereof in the drawings.

In practice it will be understood that various changes in the form, proportion, and minor details of construction and arrangement may be resorted to without departing from the spirit or sacrificing any of the advantages of my invention.

Having thus described my invention, I claim—

1. In a cable railway system, the combination with main and branch line cables, of an interposed switch-cable, a portion of the switch-cable and a contiguous portion of the main-line cable being capable of lateral deflection to cause the alignment of either with the main portion of the main-line cable, substantially as specified.

2. In a cable railway system, the combination with main and branch line cables, of an interposed switch-cable, and twin switch-pulleys arranged to carry contiguous surface-portions of the main-line and switch-cables and capable of lateral movement whereby said portion of either cable may be aligned with a main portion of the main-line cable, substantially as specified.

3. In a cable railway system, the combination with main and branch line cables, a driving drum encircled by one side of the main-line cable to be actuated thereby, and surface and loop pulleys carrying said cable, of an independent switch-cable carried by surface and direction or return pulleys and having one end thereof encircling said driving-drum, and contiguous surface pulleys of the main-line and switch-cables adjacent to the said drum being connected for uniform rotation, and being capable of movement laterally to cause alignment of either of the portions of the cables carried by said pulleys with an adjacent portion of the main-line cable on the opposite side of the driving drum, substantially as specified.

In testimony that I claim the foregoing as my own I have hereto affixed my signature in the presence of two witnesses.

GEORGE C. ORMEROD.

Witnesses:
JOHN H. SIGGERS,
H. C. YATES.